June 5, 1928.
J. O. BOVING
APPARATUS FOR RAISING LIQUIDS
Filed Feb. 10, 1926
1,672,198
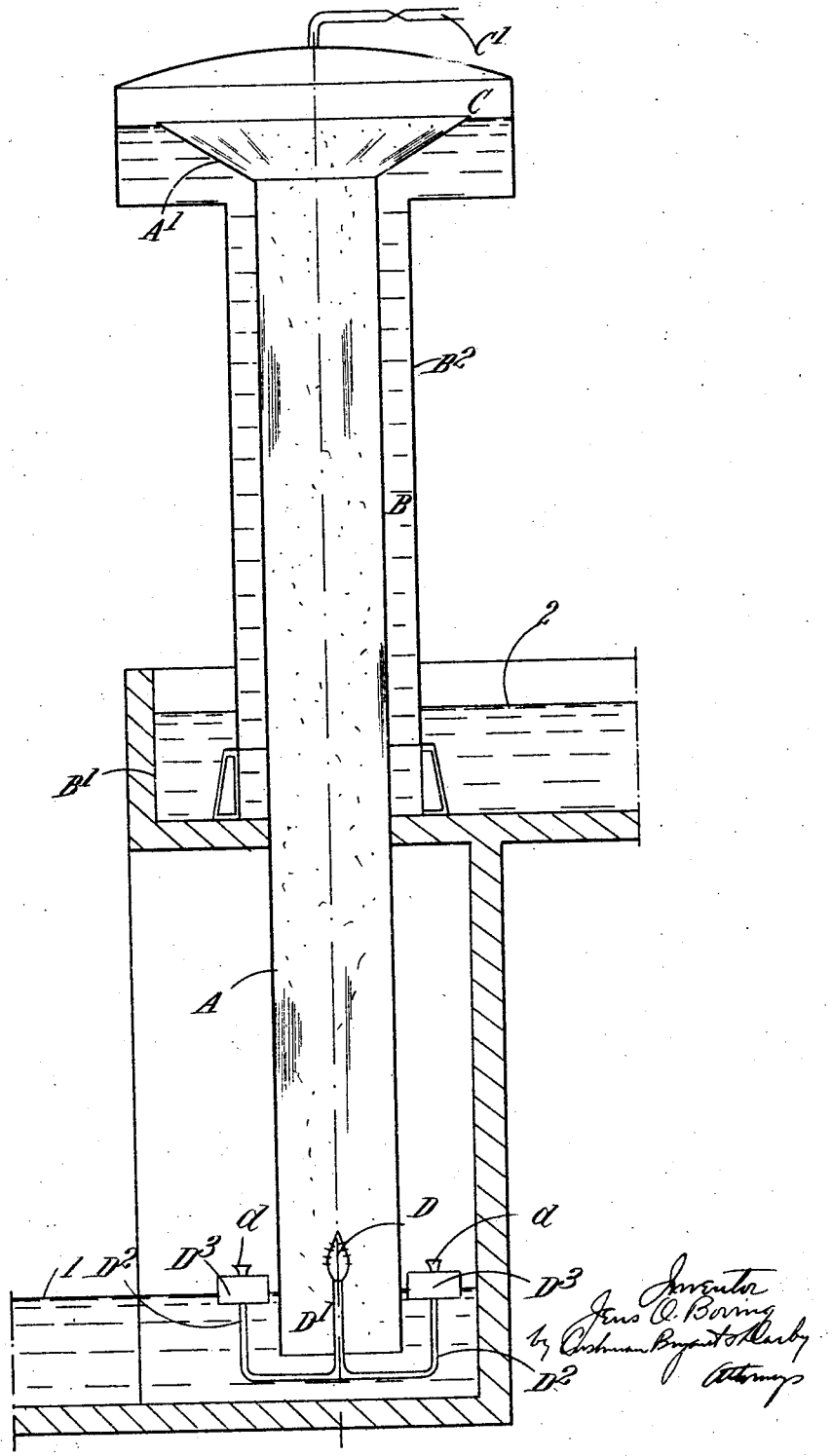

Patented June 5, 1928.

1,672,198

UNITED STATES PATENT OFFICE.

JENS ORTEN BOVING, OF WESTMINSTER, LONDON, ENGLAND.

APPARATUS FOR RAISING LIQUIDS.

Application filed February 10, 1926, Serial No. 87,371, and in Great Britain October 13, 1925.

This invention relates to liquid raising apparatus of the air-lift type. In such apparatus as at present known the liquid is raised in an uptake or ascension conduit by means of compressed air which is admitted to it at or near its lower end and escapes at atmospheric pressure with the liquid at the upper end of this conduit; it is therefore necessary to have the conduit submerged to a considerable depth and this involves the sinking of a well, bore hole or the like which it is the chief object of the present invention to dispense with.

According to the invention the apparatus comprises an ascension conduit which dips into the water or other liquid to be raised and the upper end of which enters a closed chamber (herein termed the suction chamber) where a continuous suction or partial vacuum is maintained by external means, a device for introducing air at atmospheric pressure into the lower end of the ascension conduit, and another or descending conduit the lower end of which discharges into the reservoir up to which the liquid is to be lifted and the upper end of which is in direct communication with the liquid in the suction chamber so that the two conduits and the said chamber form a siphon, the solid or un-aerated liquid column in the descending conduit (although much shorter than the ascension conduit) being sufficiently heavier than the aerated column in the ascension conduit to ensure continuous movement upwards in the ascension conduit and downwards in the descending conduit so that the liquid level in the suction chamber remains practically constant.

For maximum efficiency the point of introduction into the ascension conduit of the air at atmospheric pressure is just above the level of the liquid to be raised and to ensure that this point is kept constant in relation to the liquid level which may vary, the device for introducing the air is preferably carried by a float supported by the liquid to be raised. This device may be constituted by a bent pipe one end of which projects into the lower end of the ascension conduit and the other end of which is connected to the float and communicates with the atmosphere.

In order that the said invention may be clearly understood and readily carried into effect, the same will now be described more fully with reference to the accompanying drawing which is a vertical section shewing a form of apparatus in accordance with this invention.

A is the ascension conduit the lower end of which dips a short distance into the liquid to be raised which is indicated at 1, this liquid being hereinafter referred to as the low level liquid. B is the descending conduit the lower end of which communicates with the liquid in the reservoir B' to which the liquid from the lower level is to be raised, the liquid in the reservoir being hereinafter referred to as the high level liquid and being indicated by 2. C is the suction chamber provided with a pipe C' which is connected to a mechanical suction pump or to a hydraulic suction pump such as that described in the specification of my concurrent patent application Serial No. 251,448, filed February 2, 1928 based on English application No. 5498 dated February 27, 1925. The ascension conduit A enters the suction chamber C and preferably has a flared upper end A' as shown; the descending conduit B also communicates with the liquid in the said suction chamber. The level of the liquid in the chamber C is preferably slightly below the upper edge of the flared upper end A' as shewn, the liquid from the ascension conduit A flowing over the lip thus provided and in this manner the separation of the air from the liquid is facilitated. The aforesaid device for admitting air at atmospheric pressure into the lower end of the ascension conduit A comprises a perforated hollow member D at the end of a central pipe D' which communicates with one or more upwardly extending pipes $D^2$ arranged outside the conduit A, these pipes $D^2$ communicating at their upper ends with the atmosphere through the mouth pieces $d^2$ and being carried by floats $D^3$ arranged around the conduit A. The hollow member D is arranged within the conduit A at a height which is just above the surface of the low level liquid 1 so as to obtain maximum efficiency as aforesaid. The floats $D^3$ maintain this relative position irrespective of any rise and fall of the low level liquid 1. In the construction shown the ascension conduit A is constituted by a pipe arranged centrally within another pipe $B^2$, the annular space between the pipes A and $B^2$ constituting the descending conduit B. It is to be understood however that other arrangements of the ascension conduit and descending conduit can be employed.

In operation a suction is exerted in the chamber C through the pipe C' and in consequence a mixture of liquid from the lower level liquid 1 and air from the atmosphere introduced by the perforated hollow member D is drawn up the conduit A and enters the chamber C where the liberated air is continuously withdrawn through the pipe C', and the liquid deprived of the air descends to the reservoir B' through the conduit B and in this manner a continuous siphoning action is obtained. To facilitate the starting of the apparatus the mouth pieces $d^2$ may be fitted with cocks which are shut at first but are opened when the vacuum has been established in the chamber C. The solid or un-aerated liquid column in the conduit B although being much shorter than the aerated liquid column in the conduit A is sufficiently heavier than the aerated column to ensure a continuous siphoning action so that the liquid level in the chamber C remains practically constant. The height of the column of un-aerated liquid in the conduit B depends upon the degree of vacuum in the chamber C and the reservoir B' is therefore arranged in a position suitable for the suction it is intended to employ in the chamber C.

What I claim and desire to secure by Letters Patent of the United States is:—

1. Apparatus for raising liquids, comprising an ascension conduit which is rigid throughout its length and dips into the liquid to be raised, a closed chamber with which the upper end of said conduit communicates and in which a continuous suction or partial vacuum is maintained, a device for introducing air at atmospheric pressure into the rigid lower end of said conduit at a position just above the level of the liquid to be raised, said device being positioned inside said ascension conduit, a float which carries said device and is supported by the liquid to be raised, said float being arranged outside of the ascension conduit, a reservoir up to which the liquid is to be lifted, and a discharge conduit the lower end of which discharges into said reservoir and the upper end of which is in direct communication with the liquid in said chamber so that the two conduits and the chamber form a siphon.

2. Apparatus for raising liquids, comprising an ascension conduit which is rigid throughout its length and dips into the liquid to be raised, a closed chamber with which the upper end of said conduit communicates and in which a continuous suction or partial vacuum is maintained, a device for introducing air at atmospheric pressure into the rigid lower end of said conduit at a position just above the level of the liquid to be raised, said device being positioned inside said ascension conduit, a float which carries said device and is supported by the liquid to be raised, said float being arranged outside of the ascension conduit, a reservoir up to which the liquid is to be lifted, and a discharge conduit around the ascension conduit, the lower end of the discharge conduit discharging into said reservoir and the upper end being in direct communication with the liquid in said chamber so that the two conduits and the chamber form a siphon.

3. Apparatus for raising liquids, comprising an ascension conduit which dips into the liquid to be raised, a closed chamber with which the upper end of said conduit communicates and in which a continuous suction or partial vacuum is maintained, a bent pipe one end of which projects into the lower end of the ascension conduit and the other end of which communicates with the atmosphere, a float which carries said pipe and is supported by the liquid to be raised, said float being arranged outside of the ascension conduit, a reservoir up to which the liquid is to be lifted, and a discharge conduit surrounding a portion of said ascension conduit, the lower end of said discharge conduit discharging into said reservoir and the upper end of which is in direct communication with the liquid in said chamber so that the two conduits and the chamber form a siphon.

4. Apparatus for raising liquids, comprising an ascension conduit which dips into the liquid to be raised, a closed chamber with which the upper end of said conduit communicates and in which a continuous suction or partial vacuum is maintained, a bent pipe one end of which projects into the lower end of the ascension conduit and the other end of which communicates with the atmosphere, a float which carries said pipe and is supported by the liquid to be raised, said float being positioned outside of the ascension conduit, a reservoir up to which the liquid is to be lifted, and a discharge conduit around the ascension conduit, the lower end of the discharge conduit discharging into said reservoir and the upper end being in direct communication with the liquid in said chamber so that the two conduits and the chamber form a siphon.

5. Apparatus for raising liquids, comprising an ascension conduit which dips into the liquid to be raised, a closed chamber with which the upper end of said conduit communicates and in which a continuous suction or partial vacuum is maintained, a bent pipe one end of which projects into the lower end of the ascension conduit, and the other end of which communicates with the atmosphere, a perforated hollow member on the former end of said pipe, said member being arranged just above the lever of the liquid to be raised, a float which carries said pipe and is supported by the liquid to be raised, said float being arranged outside of the ascension conduit, a reservoir up to which the liquid is to be lifted, and a discharge conduit the lower end of which discharges into said reservoir and the upper end of which is in direct communication with the liquid in said chamber so that the two conduits and the chamber form a siphon.

6. Apparatus for raising liquids, comprising an ascension conduit which dips into the liquid to be raised, a closed chamber with which the upper end of said conduit communicates and in which a continuous suction or partial vacuum is maintained, a bent pipe one end of which projects into the lower end of the ascension conduit and the other end of which communicates with the atmosphere, a perforated hollow member on the former end of said pipe, said member being arranged just above the level of the liquid to be raised, a float which carries said pipe and is supported by the liquid to be raised, said float being arranged outside the ascension conduit, a reservoir up to which the liquid is to be lifted, and a discharge conduit around the ascension conduit, the lower end of the discharge conduit discharging into said reservoir and the upper end being in direct communication with the liquid in said chamber so that the two conduits and the chamber form a siphon.

JENS ORTEN BOVING.